United States Patent [19]

Gates

[11] Patent Number: 5,443,127
[45] Date of Patent: * Aug. 22, 1995

[54] SPRING TOOTH HARROW

[76] Inventor: Michael B. Gates, R.R. 1, Box 60, Lansford, N. Dak. 58750

[*] Notice: The portion of the term of this patent subsequent to Oct. 25, 2011 has been disclaimed.

[21] Appl. No.: 296,540

[22] Filed: Aug. 26, 1994

Related U.S. Application Data

[63] Continuation of Ser. No. 16,791, Feb. 11, 1993, Pat. No. 5,358,056, which is a continuation-in-part of Ser. No. 725,342, Jul. 3, 1991, abandoned.

[51] Int. Cl.6 ....................... A01B 19/02; A01B 73/02
[52] U.S. Cl. ..................................... 172/634; 172/621; 172/639; 172/311
[58] Field of Search ............... 172/634, 310, 311, 615, 172/619–622, 624, 624.5, 635, 629, 633, 639, 640, 643, 645, 657, 659, 660, 456, 462, 739, 740, 744, 763

[56] References Cited

U.S. PATENT DOCUMENTS

| | | |
|---|---|---|
| 974,427 | 11/1910 | Powers . |
| 3,169,027 | 2/1967 | Oerman . |
| 3,337,241 | 8/1967 | Neuhring . |
| 3,539,016 | 11/1970 | Bauer et al. . |
| 4,127,341 | 11/1978 | Stevens . |
| 4,213,506 | 7/1980 | Hake . |
| 4,342,366 | 8/1982 | Schenk et al. . |
| 4,368,783 | 1/1983 | Hake et al. . |
| 4,821,809 | 4/1989 | Summach et al. . |
| 4,877,090 | 10/1989 | Gullickson . |
| 4,923,017 | 5/1990 | Meek et al. . |
| 5,044,449 | 9/1991 | Stivek et al. ........................ 172/643 |
| 5,358,056 | 2/1993 | Gates ................................... 172/634 |

OTHER PUBLICATIONS

"Sunflower Series 5000 Field Cultivator," Sales Brochure, Sunflower Mfg. Co., Inc. Jan. 1989.
"Glencoe W300 Series Field Cultivators," Sales Brochure, Oct. 1983.
"Minimum Tillage Mulcher," Sales Brochures, Emmert Mfg. Co., Inc. Jan. 1982.

Primary Examiner—Dennis L. Taylor
Assistant Examiner—Spencer Warnick
Attorney, Agent, or Firm—Zarley, McKee, Thomte, Voorhees & Sease; Dennis L. Thomte

[57] ABSTRACT

A spring tooth harrow comprising an elongated tool bar having a plurality of harrow sections secured thereto by adjustable mounting brackets to enable the harrow section to be raised or lowered with respect to the draw bar. Each harrow section includes a pair of longitudinally extending arms which are pivotally secured to the mounting brackets and which are urged downwardly with respect thereto by pairs of springs. Fork pipes are rotatably mounted on the arms and extend therebetween and have spring teeth secured thereto. The pipes may be rotatably moved in unison to change the angle of attack of the spring teeth or the forwardmost pipe may be independently rotated with respect to the remaining pipes so that the angle of attack of the forwardmost spring teeth may be varied with respect to the trailing spring teeth.

2 Claims, 6 Drawing Sheets

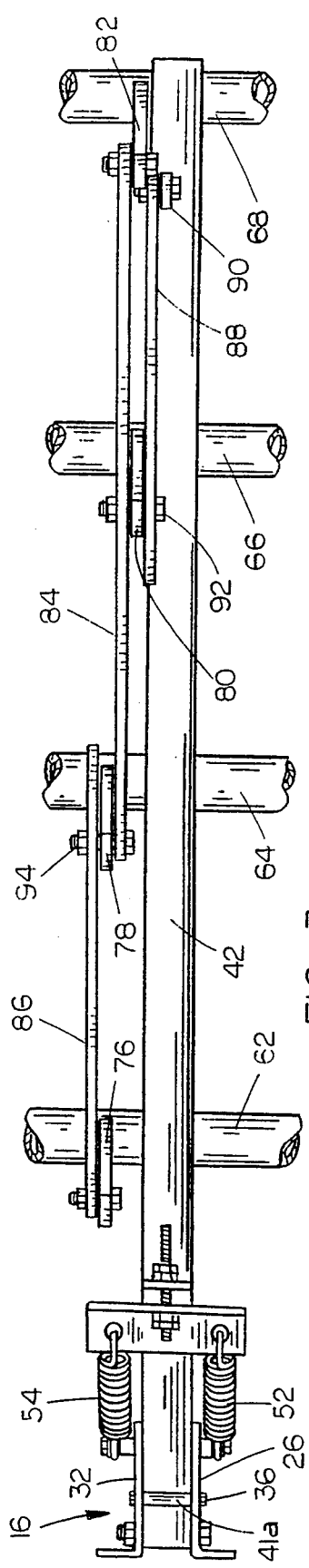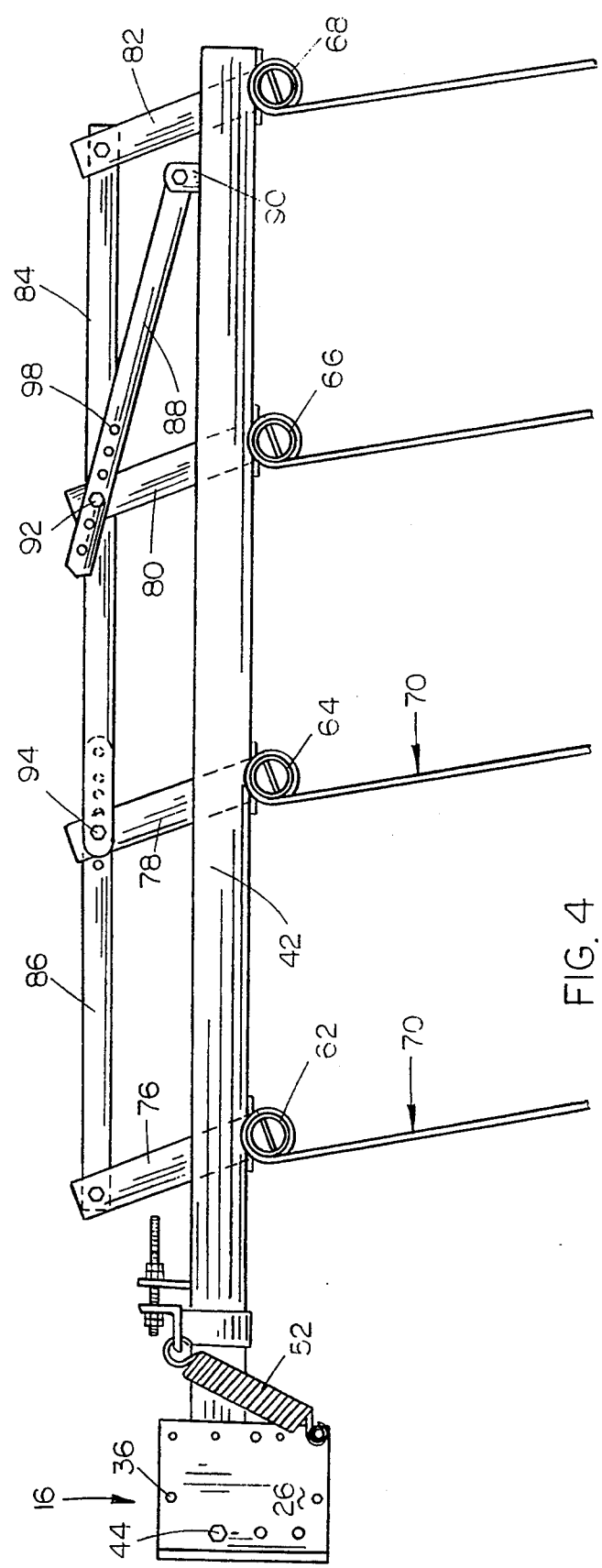

SPRING TOOTH HARROW

This is a continuation application of Ser. No. 08/016,791, filed Feb. 11, 1993, now U.S. Pat. No. 5,358,056, which was a continuation-in-part application of application Ser. No. 07/725,342, filed Jul. 3, 1991, now abandoned.

BACKGROUND OF THE INVENTION

This invention relates to a spring tooth harrow and more particularly to a spring tooth harrow including novel means for mounting the harrow on a pivotal draw bar and novel means for pressurizing the harrow sections and for maintaining the harrow sections in a substantially vertically disposed position during transport.

Conventional spring tooth harrows normally consist of an elongated, pivotal draw bar having a plurality of harrow sections mounted thereon so as to trail the draw bar. Normally, the harrow sections are connected to the draw bar by means of flexible chains or the like. One disadvantage of the prior art harrows is that the harrow sections tend to bounce when being pulled through the field. A further disadvantage of the conventional harrows is that the spring teeth thereof are not able to adequately penetrate the soil. Still another disadvantage of the prior art harrows is that there is normally not a convenient means for changing the attack angle of the spring teeth.

A further disadvantage of the prior art harrows is that when the draw bar is pivoted and folded to its transport position, the chain supported sections "bounce around" when the harrow is transported from one location to another.

Therefore, it is the principal object of the invention to provide an improved spring tooth harrow.

A further object of the invention is to provide a spring tooth harrow including novel means which permits the harrow to be selectively vertically adjustably mounted on the draw bar so that the harrow section may be lowered relative to the draw bar as the spring teeth wear.

Still another object of the invention is to provide a spring tooth harrow including novel means for pressurizing the harrow section so as to avoid section bounce and so as to ensure maximum tooth penetration.

Still another object of the invention is to provide a spring tooth harrow including novel means for pressurizing the harrow section with the pressurizing means also serving to maintain each harrow section in a substantially vertically disposed position when the draw bar is pivoted and folded to its transport position.

Yet another object of the invention is to provide a spring tooth harrow including means for maintaining each harrow section in a substantially vertically disposed position when the draw bar is pivoted to its transport position.

Still another object of the invention is to provide a spring tooth harrow including means for adjusting the front row of spring teeth relative to the remaining rows of spring teeth for each section.

These and other objects of the present invention will be apparent to those skilled in the art.

BRIEF DESCRIPTION OF THE DRAWINGS

FIG. 3 is a partial top view of one end of one harrow section;

FIG. 4 is a side view of one of the harrow sections;

SUMMARY OF THE INVENTION

Figure 1:
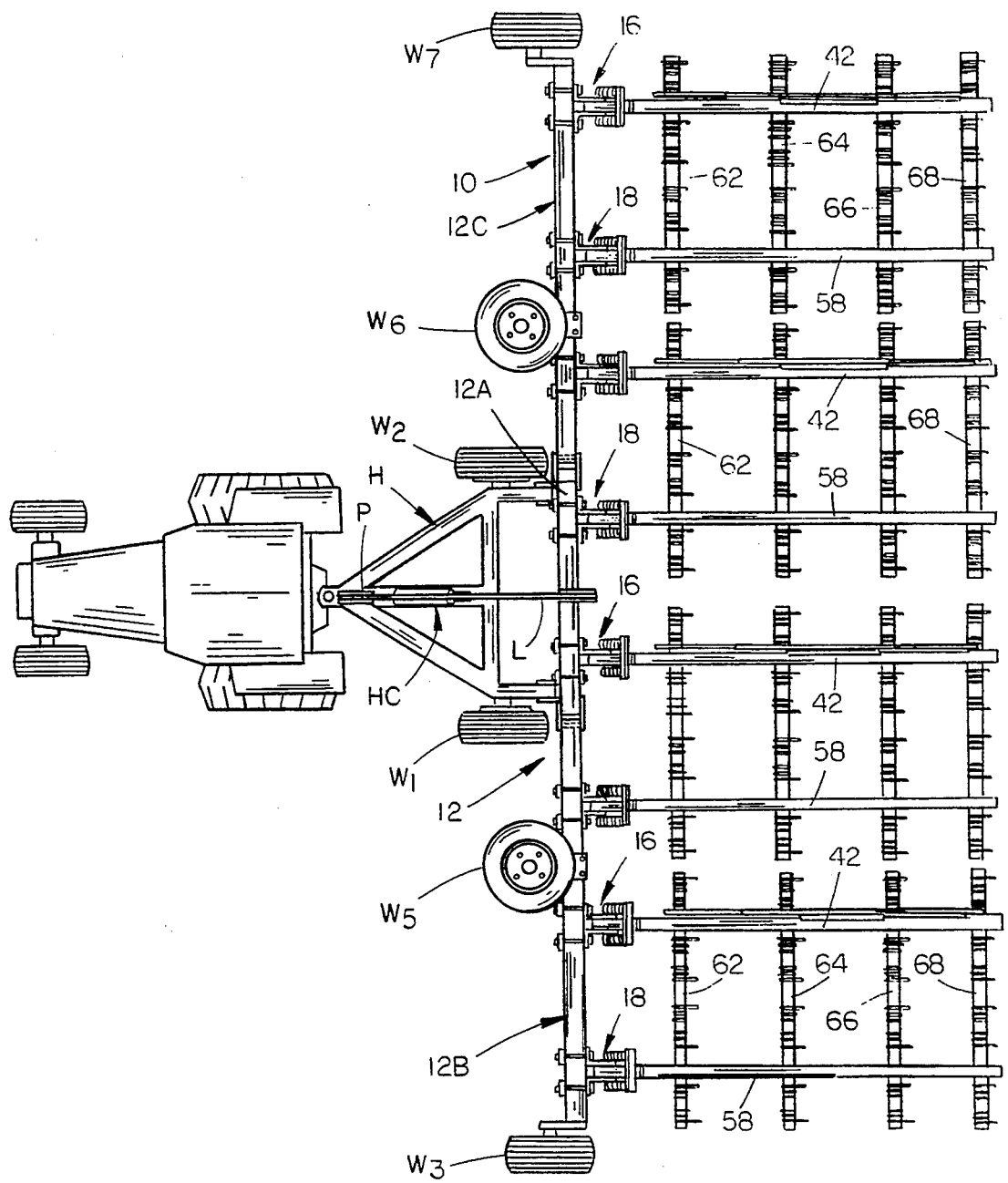
FIG. 1 is a plan view of the spring tooth harrow of this invention.
Figure 2:
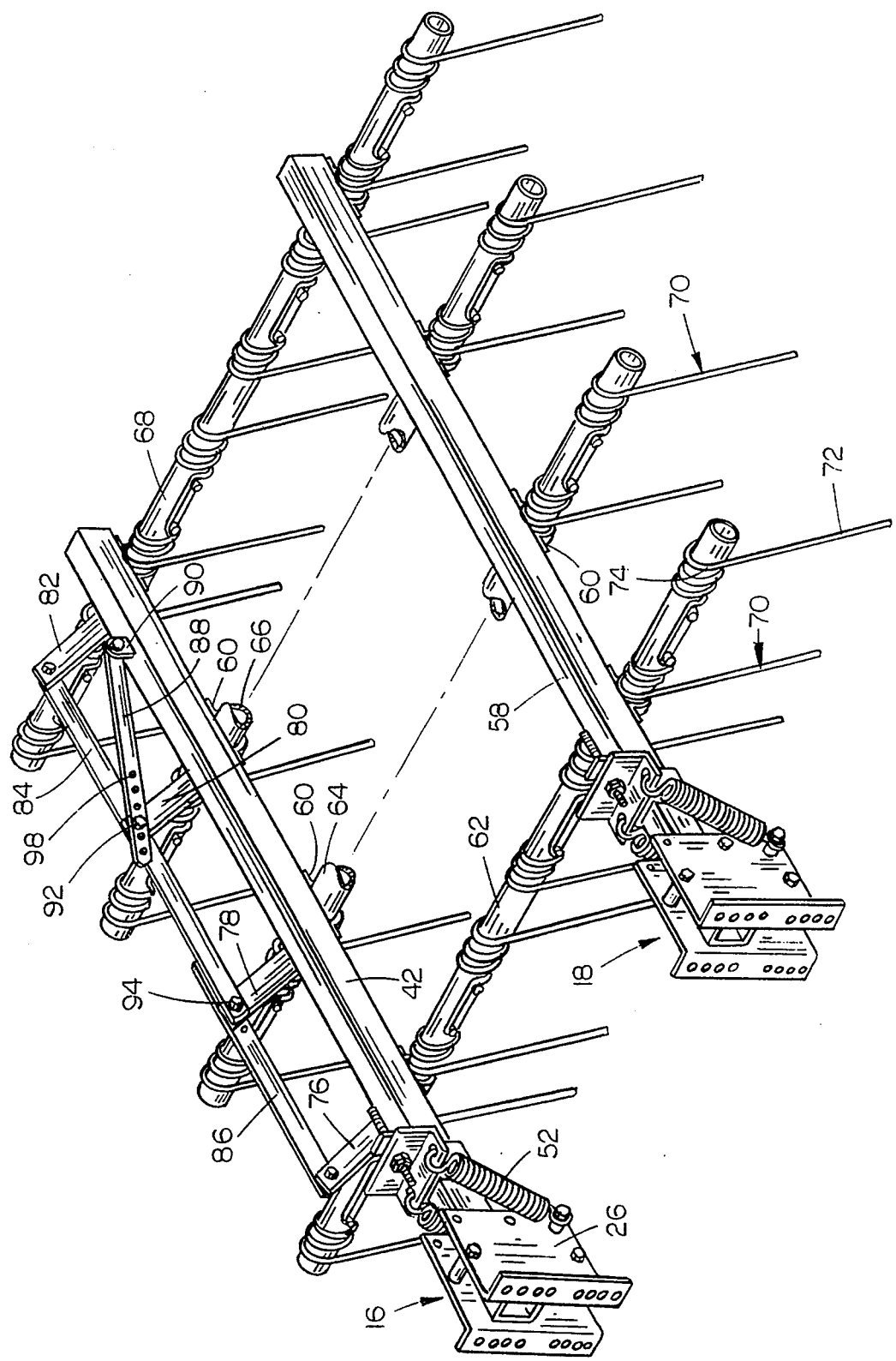
FIG. 2 is a perspective view of one end of one harrow section.

An improved spring tooth harrow is described comprising an elongated, pivotal draw bar having a plurality of the harrow sections of this invention mounted thereon. Each of the harrow sections includes a pair of mounting brackets at the forward end thereof which are selectively vertically adjustably mounted on the draw bar so that the mounting bracket may be lowered relative to the draw bar as the harrow teeth become worn. A pair of support arms are typically connected to the mounting brackets and include a spring means so that the harrow section will be pressurized to prevent harrow section bounce and to ensure that the spring teeth will adequately penetrate the soil. A plurality of transversely extending tooth supports are rotatably or pivotally mounted on the support arms and may be pivoted with respect thereto to change the angle of attack of the spring teeth. The forward most row of spring teeth may be pivoted relative to the remaining rows of spring teeth. The spring means also serves to maintain the harrow sections in a well supported, substantially vertically disposed position when the draw bar is pivoted or rotated to its transport position.

DESCRIPTION OF THE PREFERRED EMBODIMENT

The spring tooth harrow of this invention is referred to generally by the reference numeral 10 and is designed to be pulled behind a tractor or the like to harrow the soil. Most spring tooth harrows include an elongated transversely extending draw bar 12 to which the various harrow sections 14 are connected. Draw bar 12 is of conventional design and includes a center section 12A supported by wheels $W_1$ and $W_2$. Wing section 12B and 12C are pivotally connected to the outer ends of center section 12A in conventional fashion. Wheels $W_3$ and $W_4$ support the ends of the wing sections 12B and 12C respectively when the draw bar 12 is in its field position of FIG. 1. The axis of each of the pivotal connections between the center section 12A and the wing sections 12B and 12C wheels dwells in a horizontal plane transverse to the longitudinal axis of draw bar 12 when the draw bar 12 is in the field position of FIG. 1.

Figure 7:
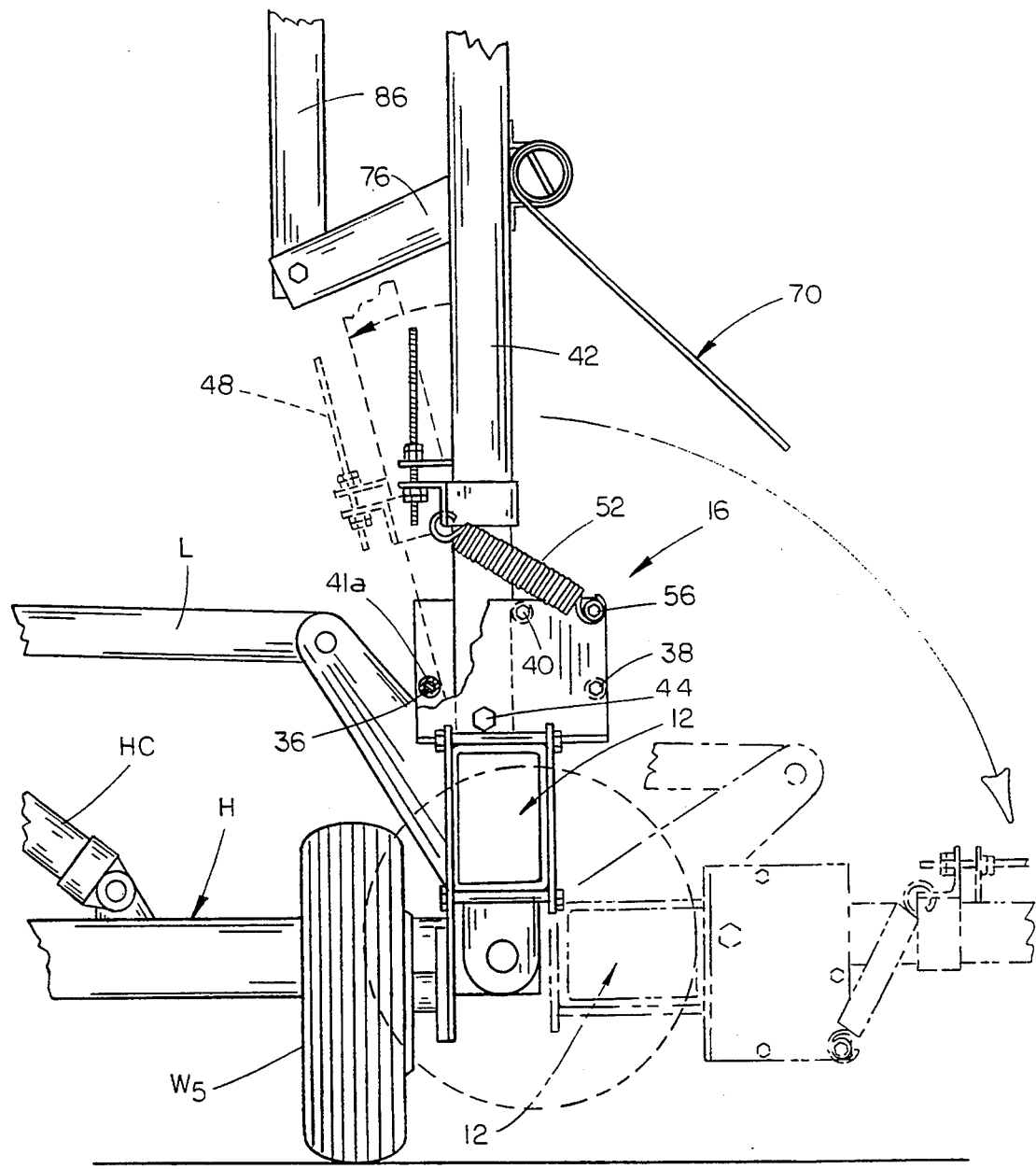
FIG. 7 is a partial side view illustrating the harrow sections in a substantially vertically disposed position after the draw bar has been pivoted or rotated to its transport position.

Draw bar 12 is rotatable or pivotal with respect to hitch H by conventional means to enable draw bar 12 to be selectively moved between the field position of FIG. 1 to the transport position of FIG. 7 so that the harrow sections may be raised from the ground. As seen in the drawings, a hydraulic cylinder HC is mounted on hitch H and has its cylinder rod connected to post P. Post P is connected to center section 12A of draw bar 12 by means of a linkage L. Thus, extension of the cylinder rod of the hydraulic cylinder HC causes draw bar 12 to be rotated from the field position to the transport position. Conversely, retraction of the cylinder rod of hydraulic cylinder HC causes the draw bar 12 to be moved from its transport position of FIG. 7 to the field position of FIG. 1. When the draw bar 12 is moved to its transport position, wheels $W_5$ and $W_6$ are lowered into ground engagement in conventional fashion to enable the wing sections 12B and 12C to be folded rearwardly with respect to center section 12A to reduce the width of the harrow for transport in conventional fashion. The spring tooth harrow of this invention may be conveniently attached to almost every type of draw bar and can be supplied as a replacement for worn harrow sections. Thus, such an invention will not always be sold with a draw bar since the harrow section of this invention can be conveniently attached to square or rectangular draw bars.

Each of the harrow sections 14 comprises a pair of spaced-apart mounting brackets 16 and 18 which are selectively vertically adjustably mounted to the draw bar by means of conventional bolts and clamps. Inasmuch as each of the mounting brackets 16 and 18 are identical, only mounting bracket 16 will be described in detail.

Mounting bracket 16 includes a pair of vertically disposed bracket members 20 and 22 which are L-shaped. Bracket member 20 includes a flat front portion having a flat rear portion extending rearwardly therefrom. The flat front portion is provided with a plurality of bolt openings 28 formed therein to permit the bracket member to be selectively vertically adjustably mounted on the draw bar. Similarly, bracket member 22 includes a flat front portion 30, flat rear portion 32 and bolt openings 34 in flat portion 30. Spacer bolts 36, 38 and 40 extend between the flat rear portions 26 and 32 and have collars 41a, 41b and 41c mounted thereon between the rear portions 26 and 32 to maintain the horizontal spacing therebetween. The forward end of arm 42 is pivotally connected to mounting bracket 16 as seen in the drawings by means of bolt 44. Bolts 36 and 40 also limit the pivotal movement of arm 42 with respect to bracket 16 as will be described in greater detail hereinafter.

Figure 5:
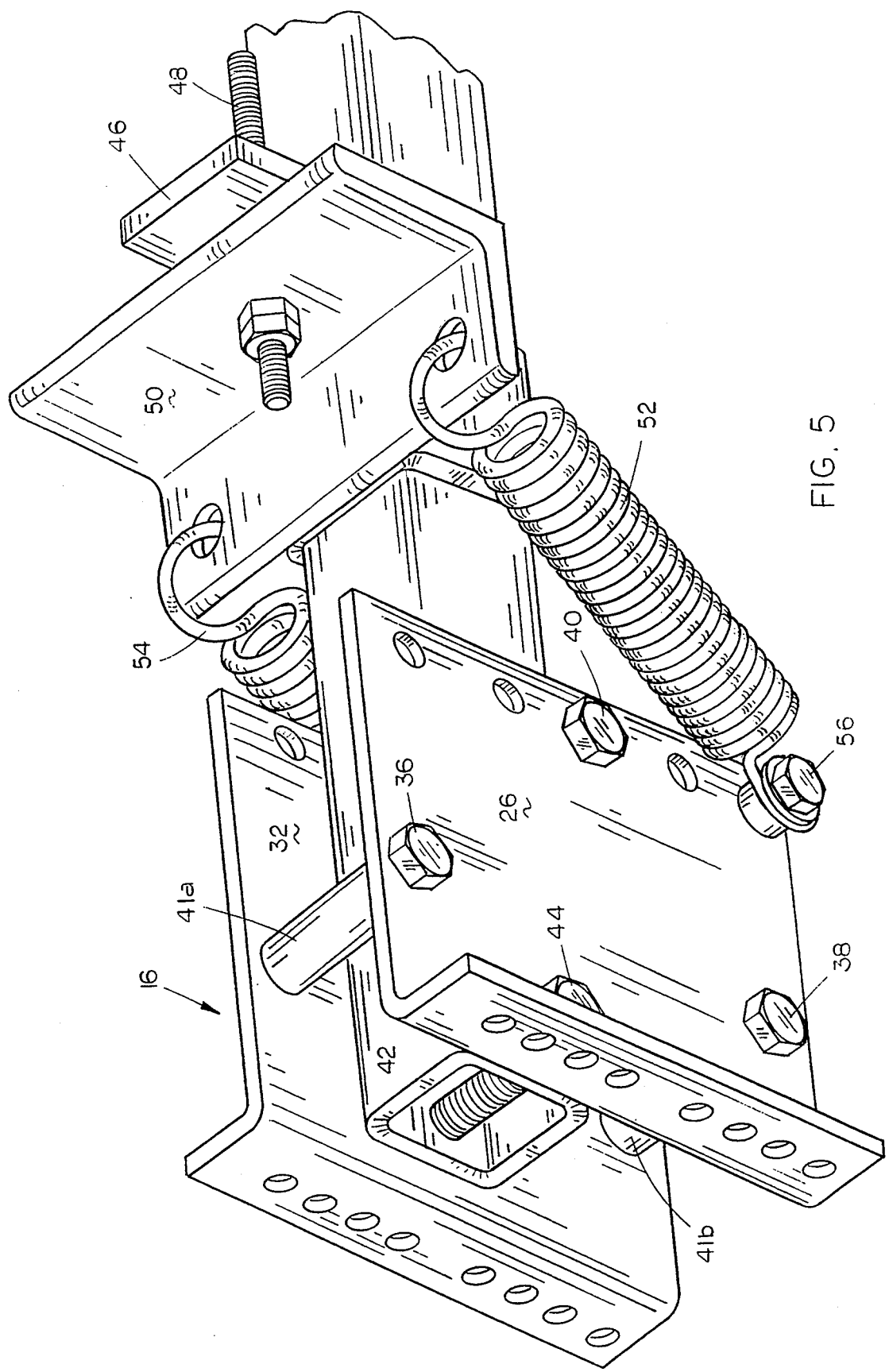
FIG. 5 is a perspective view of the means for mounting one end of the harrow section to the tool bar.
Figure 6:
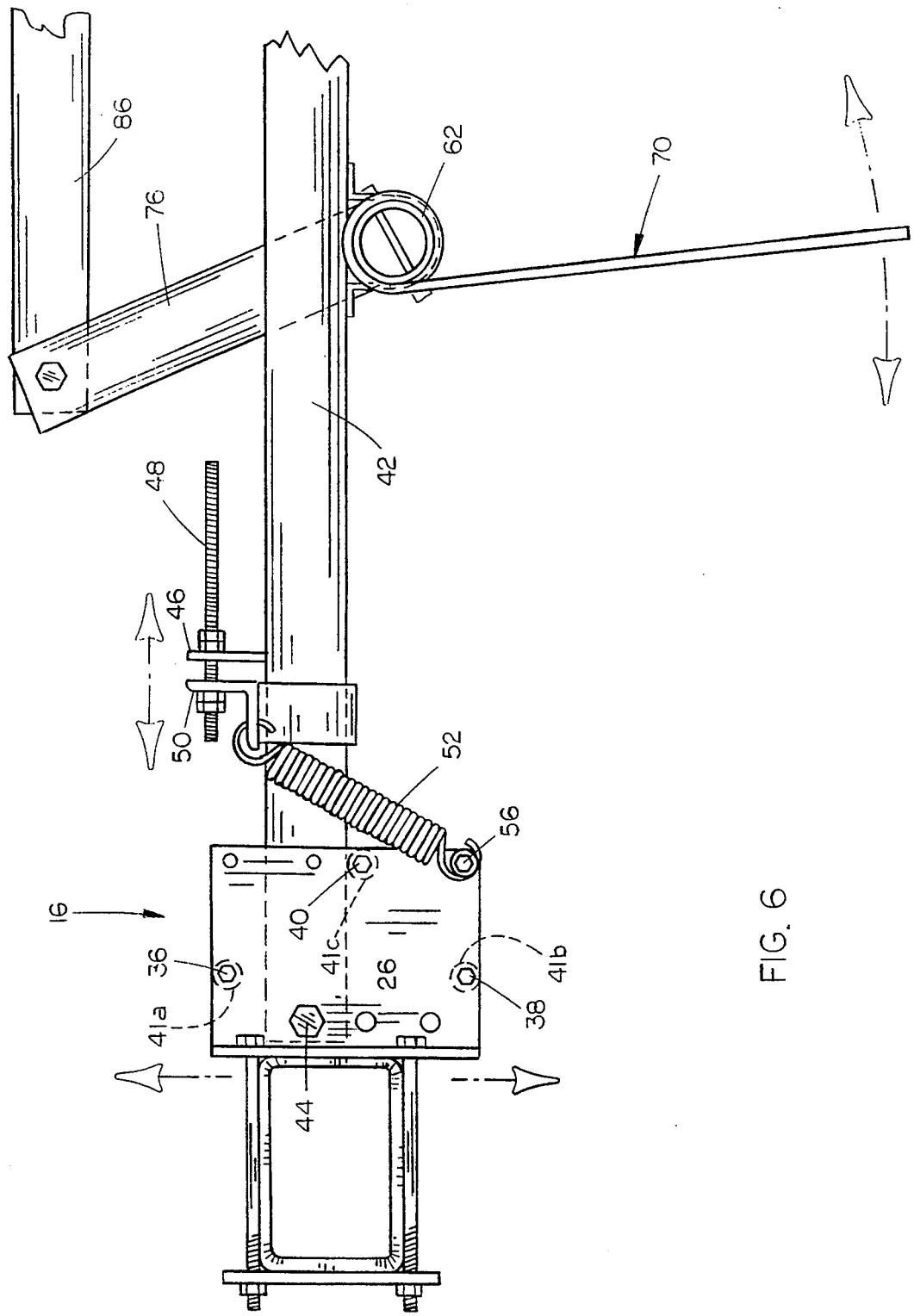
FIG. 6 is a side elevational view illustrating the means by which one harrow section is secured to the tool bar.

Ear 46 is welded to the upper surface of arm 42 and has an adjustment bolt 48 extending therethrough. Angle 50 is mounted on the forward end of adjustment bolt 48 and is disposed transversely to the longitudinal axis of arm 42 as seen in FIG. 5. Springs 52 and 54 are secured at their upper ends to angle 50 and are secured at their lower ends to the opposite ends of bolt 56 which is secured to and which extends between the lower rearward ends of flat rear portions 26 and 32. The adjustment of bolt 48 changes the tension in the springs 52 and 54 to vary the amount of downward yieldable pressure exerted on the forward end of arm 42. Arm 58 is identical to arm 42 and is pivotally connected to bracket 18. Arms 42 and 58 are provided with a plurality of U-shaped straps 60 welded to the underside thereof in which are rotatably received the support pipes 62, 64, 66, and 68. A plurality of spring teeth 70 are secured to each of the support pipes 62 and includes shank portion 72 which extends downwardly from coiled portion 74. Bars 76, 78, 80 and 82 are welded to pipes 62, 64, 66 and 68 respectively and extend upwardly therefrom. Link 84 pivotally connects the upper ends of bars 78, 80 and 82. Link 86 adjustably connects the upper ends of bars 76 and 78 as seen in the drawings. Thus, the bars 76, 78, 80 and 82 are moved in unison by the links 84 and 86 when the links 84 and 86 are connected. Movement of the bars 76, 78, 80 and 82 causes rotation of the support pipes 62, 64, 66 and 68 respectively so as to change the angle of attack of the shank portions of the spring teeth. Links 84 and 86 are maintained in position by means of arm 88 which it pivotally connected at its rearward end to ear 90 welded to the upper side of the rearward end of arm 42. The forward end of arm 88 is adjustably secured to the bolt 92 which connects the upper end of bar 80 with link 84. Thus, when bolt 92 is removed, the bars 76, 78 and 82 may be pivoted in unison to the desired position and then held in that position by reinstalling bolt 92 through bar 80, link 84 and the forward end of arm 88. The bar 80 and corresponding pipe 66 is obviously moved to correspond with the other tubes 62, 64, 68 so that the bolt 92 can be reinserted to hold the desired position of all the pipes.

The various harrow sections are secured to the draw bar 12 by the brackets 16 and 18. As the spring teeth become worn, the brackets 16 and 18 may be lowered with respect to the draw bar to effectively lower the lower ends of the shank portions of the spring teeth 70. During field operation, the springs 52 and 54 urge arm 42 downwardly with respect to the mounting bracket 16 so as to prevent harrow bounce and so as to force the spring teeth into the soil which is being harrowed. The springs associated with bracket 18 similarly urge arm 58 downwardly with respect to the mounting bracket 18.

If it is desired to have the angle of attack of all of the harrow teeth to be the same, bolt 94 is left in position and the bolt 92 is removed. Bars 84 and 86 are then moved in unison to cause the pipes 62, 64 and 68 to rotate within their straps 60 in unison. When the teeth have been positioned as desired, the bolt 92 is then reinserted through one of the openings 98 in arm 88 after the bar 80 is moved to correspond with the other bars. It if is desired to change the angle of attack of the spring teeth on pipe 62 with respect to the remaining pipes, bolt 94 is removed to permit pipe 62 to be rotated independently of the remaining pipes thereby permitting angle of attack of the spring teeth on the pipe 62 to have a different angle than the remaining teeth. Many farmers prefer that the shank portions 72 on teeth 70 on the pipe 62 extend rearwardly at a greater angle than the spring teeth on the remaining pipes so as to be better able to penetrate through trash or stubble on the ground being harrowed.

As seen in FIG. 7, when draw bar 12 has been moved to its transport position, the harrow sections are positioned in a substantially vertically disposed position. The springs 52 yieldably maintain the harrow sections in the transport position of FIG. 7 to prevent the harrow sections from "bouncing around" as is the case with chain supported harrow sections. This is accomplished by the springs 52 urging the arms 42 and 58 rearwardly against the collars 42c on bolts 40. Further, the bolts 36 and 40 on each mounting bracket also limit the movement of the associated arms 42 to maintain the arms 42 in a substantially vertically disposed position.

Thus it can be seen that the invention accomplishes at least all of its stated objectives.

I claim:
1. In combination:
   a tractor having a hitch extending rearwardly therefrom;

an elongated, horizontally disposed and transversely extending draw bar operatively secured to said hitch and having rearward and forward sides;

said draw bar being wheel supported and being pivotally movable, about a horizontal axis with respect to said hitch to enable the draw bar to be pivoted from a field position to a transport position;

means for pivoting said draw bar from said field position to said transport position;

a plurality of harrow sections secured to said draw bar and extending rearwardly therefrom;

each of said harrow sections including at least first and second horizontally spaced mounting brackets which are secured to said draw bar;

first and second arms pivotally connected at their forward ends to said first and second mounting brackets respectively, said first and second arms extending rearwardly therefrom;

a resilient means interconnecting each of said arms with its respective mounting bracket for yieldably maintaining the harrow section in ground engagement;

a plurality of horizontally spaced tooth supports selectively rotatably mounted on the underside of said arms and extending therebetween;

a plurality of spring teeth operably secured to said tooth supports and extending downwardly therefrom;

a selectively movable linkage means interconnecting said tooth supports so that said tooth supports may be rotated as a unit;

an adjustment member pivotally connected at one end to one of said arms, and selectively adjustably connected at an opposite end to said linkage means, for selectively fixing said linkage means in a predetermined position;

said tooth supports including a forward tooth support, a rearward tooth support, and at least one intermediate tooth support;

said linkage means including means for selectively rotatably moving said forward tooth support with respect to the other tooth supports;

a stop associated with each of said mounting brackets for limiting the pivotal movement of the associated arm so that when said draw bar is moved to its said transport position, said stop limits the forward pivotal movement of said respective arm and the tooth supports secured thereto.

2. A spring tooth harrow, comprising, an elongated, horizontally disposed and transversely extending draw bar having rearward and forward sides;

said draw bar being wheel supported and having a hitch extending forwardly therefrom for attachment to a tractor;

said draw bar being selectively pivotally mounted, about a horizontal axis, to said hitch, whereby said draw bar may be pivoted from a field position to a transport position;

means for pivoting said draw bar from its field position to its transport position;

a plurality of harrow sections operatively secured to said draw bar and being positioned rearwardly thereof;

mounting means securing said harrow sections to said draw bar;

said mounting means including a resilient means for yieldably maintaining the associated harrow section in ground engagement and to yieldably maintain the associated harrow section in a substantially vertically disposed position when said draw bar is moved to its transport position;

each of said harrow sections including at least a pair of horizontally spaced-apart arms which extend rearwardly with respect to said draw bar; a plurality of horizontally spaced tooth supports selectively rotatably mounted on the underside of said arms and extending therebetween; a plurality of spring teeth operably secured to said tooth supports and extending downwardly therefrom;

a selectively movable linkage means interconnecting said tooth supports so that said tooth supports may be rotated as a unit;

an adjustment member pivotally connected at one end to one of said arms, and selectively adjustably connected at an opposite end to said linkage means, for selectively fixing said linkage means in a predetermined position;

said tooth supports including a forward tooth support, a rearward tooth support, and an intermediate tooth support;

said linkage means including means for selectively rotatably moving said forward tooth support with respect to the other tooth supports.

* * * * *